(12) United States Patent
Lee et al.

(10) Patent No.: US 10,482,103 B2
(45) Date of Patent: Nov. 19, 2019

(54) KEY-VALUE STORE FOR LIGHTWEIGHT REPLICATION OF METADATA

(71) Applicant: SAP SE, Walldorf (DE)

(72) Inventors: Joo Yeon Lee, Seoul (KR); Jaehwa Kim, Seoul (KR); Joongkoo Lee, Seoul (KR)

(73) Assignee: SAP SE, Walldorf (DE)

( * ) Notice: Subject to any disclaimer, the term of this patent is extended or adjusted under 35 U.S.C. 154(b) by 247 days.

(21) Appl. No.: 15/592,075

(22) Filed: May 10, 2017

(65) Prior Publication Data

US 2018/0329967 A1    Nov. 15, 2018

(51) Int. Cl.
*G06F 16/27* (2019.01)
*G06F 16/22* (2019.01)

(52) U.S. Cl.
CPC .......... *G06F 16/27* (2019.01); *G06F 16/2228* (2019.01)

(58) Field of Classification Search
None
See application file for complete search history.

(56) References Cited

U.S. PATENT DOCUMENTS

| 7,797,351 | B2 | 9/2010 | Beck |
| 7,930,479 | B2 | 4/2011 | Barda |
| 8,554,721 | B2 | 10/2013 | Engel |
| 8,738,569 | B1 * | 5/2014 | Choi .................... G06F 16/214 707/619 |
| 9,116,862 | B1 * | 8/2015 | Rath .................... G06F 11/2097 |
| 9,244,958 | B1 * | 1/2016 | MacCanti ............. G06F 16/273 |
| 9,460,176 | B2 | 10/2016 | Kwon et al. |
| 9,733,869 | B1 * | 8/2017 | Fan ........................ G06F 3/0665 |
| 9,753,813 | B1 * | 9/2017 | Fan ...................... G06F 11/1448 |

(Continued)

OTHER PUBLICATIONS

SAP, "System Landscape Overview," *SAP HANA Data Warehousing Foundation—Data Distribution Optimizer Administration Guide*, downloaded from https://help.sap.com/viewer/ bfa0630d575d473a98ea9e2a14c9d35a/1.0.5.2/en-US/ 9e4414de3fba426e99bb2e32fa54ceec.html, Version: 1.0 SPS 05 Patch 2, 3 pp. (document not dated, downloaded on Apr. 26, 2017).

(Continued)

*Primary Examiner* — Hung D Le
(74) *Attorney, Agent, or Firm* — Klarquist Sparkman, LLP

(57) ABSTRACT

Methods and systems are disclosed for managing replication of metadata in a master-slave database environment. While metadata is managed on a master node using database tables with transaction guarantees, metadata copies on the slave node are managed using a lightweight key-value store. In exemplary embodiments, master metadata database tables are mapped to respective key-value structures at one or more slave nodes. The key-value structures have entries pointing to respective metadata objects, which include copies of metadata items stored in the master metadata database tables. The key-value structures can be hierarchically organized under a parent key-value structure. Metadata object versions can be organized as a linked list to facilitate multi-version concurrency control. Methods are disclosed for building the key-value store, for retrieving metadata from the store, for updating the store, for providing multi-version concurrency control, and for pruning obsolete metadata versions. Variants are disclosed.

20 Claims, 12 Drawing Sheets

(56) References Cited

U.S. PATENT DOCUMENTS

2016/0103845 A1* 4/2016 Yeddanapudi ........ G06F 16/172
707/756

OTHER PUBLICATIONS

SAP, "Metadata from Remote Systems," *SAP HANA Data Warehousing Foundation—Data Distribution Optimizer Administration Guide*, downloaded from https://help.sap.com/viewer/bfa0630d575d473a98ea9e2a14c9d35a/1.0.5.2/en-US/1c9f561cc6b94e55906c817ded7d2be5.html, Version: 1.0 SPS 05 Patch 2, 2 pp. (document not dated, downloaded on Apr. 26, 2017).
SAP, "Importing Metadata from Remote Systems," *SAP HANA Data Warehousing Foundation—Data Distribution Optimizer Administration Guide*, downloaded from https://help.sap.com/viewer/bfa0630d575d473a98ea9e2a14c9d35a/1.0.5.2/en-US/b0fa68b4816e437bbd70c45fb538e992.html, Version: 1.0 SPS 05 Patch 2, 2 pp. (document not dated, downloaded on Apr. 26, 2017).
SAP, "SAP HANA Master Guide," SAP HANA Platform 2.9 SPS 00, downloaded from https://help.sap.com/doc/e95f6750b0fd10148ea5c6be75016694/2.0.00/en-US/SAP_HANA_Master_Guide_en.pdf, Document Version: 1.0., 86 pp., Nov. 30, 2016.
Gembalczyk et al., "An Experimental Analysis of Different Key-Value Stores and Relational Databases," downloaded from https://infosys.cs.uni-saarland.de/publications/GSD17_extended.pdf, 19 pp. (2017).
SUSE Blog, "SAPHanaSR-ScaleOut: Automating SAP HANA System Replication for Scale—Our Installations with SLES for SAP Applications," downloaded from https://www.suse.com/communities/blog/saphanasr-scaleout-automating-sap-hana-system-replication-scale-installations-sles-sap-applications/, 6 pp. (document not dated, downloaded on Apr. 26, 2017).
Wikipedia, "Relational database," downloaded from https://en.wikipedia.org/wiki/Relational_database, 6 pp. (document last modified on Apr. 11, 2017, downloaded on Apr. 12, 2017).
Wikipedia, "ACID," downloaded from https://en.wikipedia.org/wiki/ACID, 5 pp. (document last modified on Mar. 6, 2017, downloaded on Apr. 26, 2017).

* cited by examiner

KEY-VALUE STORE FOR LIGHTWEIGHT REPLICATION OF METADATA

BACKGROUND

Databases are widely used in diverse fields. The scale of database deployments continues to increase in size, in transaction-handling capacity, and in geographic reach. There remains a continuing need for efficient distributed database technologies.

SUMMARY

In summary, the detailed description is directed to various innovative technologies for metadata management in a master-slave database environment. Examples of disclosed technologies use one or more key-value structures to maintain and retrieve copies of metadata items at a slave node, while retaining a row store metadata table at the master node. The master metadata table can be operated as a database table with guaranteed transactions and their attendant overhead, while slave key-value structures can be operated in a lightweight manner, without the same overhead or guarantees.

In one aspect, the disclosed technologies are directed to computer-readable media storing software instructions for creating a slave key-value store with one or more key-value entries, and attaching metadata objects to respective key-value entries. The key-value store serves to catalog, index, or access local copies of master metadata items. On the master node, one or more database tables store metadata associated with a database instance on the master node. The metadata can be associated with tables, views, users, or various constructs, modules, or features of the database instance. Local copies of some or all of the master metadata items can be stored on a slave node. The key-value store comprises key-value entries organized as one or more key-value structures. A key-value structure can include one or more key-value entries, each having a key and a value. The value field of a key-value entry can store a metadata object that includes a metadata item, or a reference to a metadata object storing the metadata item. Alternatively, the value field of a key-value entry can store a reference to a sequential data structure (e.g., linked list) that includes a version of the metadata object with the metadata item, and may include other versions of the metadata object. Or, the value field can store, at least at the time of initialization, a placeholder that will be replaced by the metadata object or reference. The key field serves as an identifier of an associated metadata object or metadata item and can be used to look up a desired key-value entry in a slave key-value store. The key field can contain a qualified name of the associated metadata item. In some examples, key-value entries for metadata items can be created when copying application-level database tables characterized by the metadata items from the master node to the slave node. In other examples, key-value entries can be created when needed, for example, in response to a request for an associated metadata item.

In examples, a metadata item can be a single or atomic element such as an integer, a floating point number, or a text string, while in other examples a metadata item can be a plurality of elements. In examples, one or more elements of a metadata item can describe an application-level database table, a table partition, a table replica, or a database view, or another feature or attribute of the database instance on the master node, as described herein.

In some examples, multiple versions of a metadata object can be attached to a single key-value entry to facilitate multi-version concurrency control (MVCC). The metadata object versions can be organized as a sequential data structure containing multiple metadata objects, for example, a linked list. In such examples, the value field of a key-value entry can contain a reference to the head of the linked list. As successive versions (or snapshots) of a metadata item are received at the slave node, they can be packaged as respective metadata objects and attached at the tail of the linked list (or, for another approach in which metadata object versions are ordered in descending order, at the head of the linked list), and thereby attached to the key-value entry for the metadata item. In addition to metadata items, a metadata object version can incorporate one or more timestamps indicating a timestamp range for which that metadata object version is valid. In examples, successive metadata versions are valid for successive time intervals that are contiguous but non-overlapping. The software instructions of the disclosed technology can also be used to perform some or all of these actions.

In some examples, multiple key-value stores can be established on respective slave nodes of a common master node. The multiple key-value stores can be the same or different. Metadata from a first master metadata database table can be stored on one slave node but not on another slave node, or stored on both slave nodes. Two slave nodes can store non-identical sets of metadata items from a particular metadata database table.

In another aspect, the disclosed technologies are directed to computer-readable media storing software instructions for retrieving copies of one or more metadata items from a key-value store on a slave node, in response to a request for the metadata item(s). Based on the request, a search value is formed. The search value is looked up among keys of the key-value store, and the matching key-value entry is used to obtain the locally stored copies of one or more of the requested metadata items. In some examples, a metadata object including requested metadata item(s) is directly stored in, and can be retrieved from, the value field of the matching key-value entry. In other examples, the value field contains a reference, such as a pointer, to a metadata object in which one or more requested metadata items are stored. In such examples, the value field can be dereferenced to obtain the metadata object, and the copy of the metadata item can be extracted from the metadata object. In further examples, the value field contains a reference to a sequential data structure, such as a linked list, of multiple versions of metadata objects which can be organized by timestamp. In such examples, the value field can be dereferenced to obtain the head of a sequential data structure (e.g., linked list), and the sequential data structure can be traversed to obtain the correct version of the metadata object having a timestamp matching the request; copies of the requested metadata item(s) can be extracted from this metadata object. If the request timestamp is outside the timestamp range of a given metadata object version, then the given metadata version is not the correct version. If the request timestamp is within the range of a subsequent metadata object version, then the subsequent metadata object version is the correct version.

In another aspect, the disclosed technologies are directed to computer-readable media storing software instructions for maintaining or pruning a sequential data structure of versions of metadata objects. A determination can be made whether a metadata object version is still needed, for example, based on the upper limit of its timestamp range. When the determination is made that the metadata object version is no longer needed, it can be dissociated from its attached key-value entry.

In a further aspect, the disclosed technologies are directed to computer-readable media storing software instructions for creating and maintaining the key-value store as a hierarchical collection of key-value structures. A parent key-value structure has parent key-value entries for other key-value structures. Respective distinct child key-value structures can be instantiated in the slave key-value store for each metadata database table of the database instance on the master node. The child key-value structures contain key-value entries for respective master metadata items as described herein. Each parent key-value entry contains a key serving as an identifier of the associated child key-value structure, and a value which is a reference to the associated child key-value structure.

In examples, the child key-value structure can be established along with formation of the associated master metadata database table, such as when a view is created. In other examples, the child key-value structure can be established along with copying of a database table or other construct from the master node to the slave node. In further examples, the child key-value structure can be established at the time when a metadata item from the associated master metadata database table is requested at the slave node.

In another aspect, the disclosed technologies are directed to computer-readable media storing software instructions for retrieving copies of metadata items from a hierarchical key-value store. Upon receipt of a request for a metadata item from a given master metadata database table, a structure search value is determined and looked up in a parent key-value structure to find a reference to the child key-value structure for the given master metadata database table. Based at least partly on the request, a metadata item search value is determined and looked up in the child key-value structure to find the matching key-value entry associated with the requested metadata item. As described herein, the matching key-value entry is used to get the copy of the metadata item which, in examples, can be stored in a metadata object within the key-value entry, or in a metadata object directly pointed to by the value field of the key-value entry, or in a metadata object version in a sequential data structure (e.g., linked list) of metadata objects pointed to by the value field.

In another aspect, the disclosed technologies are directed to computer-readable media storing software instructions for operating on the master metadata database tables using database transactions having guarantees, and for using non-guaranteed operations on the slave key-value store. In examples, the master metadata database tables can only be operated on with guaranteed transactions. In examples, guaranteed transactions have properties of atomicity, consistency, isolation, and durability ("ACID"). In examples, a master metadata database table can be an in-memory row store table managed by a database management system ("DBMS"). In contrast, in examples, key-value store operations are lacking in one or more of the ACID properties.

In another aspect, the disclosed technologies are directed to computer-readable media storing software instructions for implementing key-value entries that are read-only. The key-value store can be managed as a read-only cache.

The innovations can be implemented as part of one or more methods, as part of one or more computing systems adapted to perform an innovative method, or as part of non-transitory computer-readable media storing computer-executable instructions for causing a computing system to perform the innovative method(s). The various innovations can be used in combination or separately. The foregoing and other objects, features, and advantages of the invention will become more apparent from the following detailed description, which proceeds with reference to the accompanying figures.

DETAILED DESCRIPTION

Overview

Figure 1:
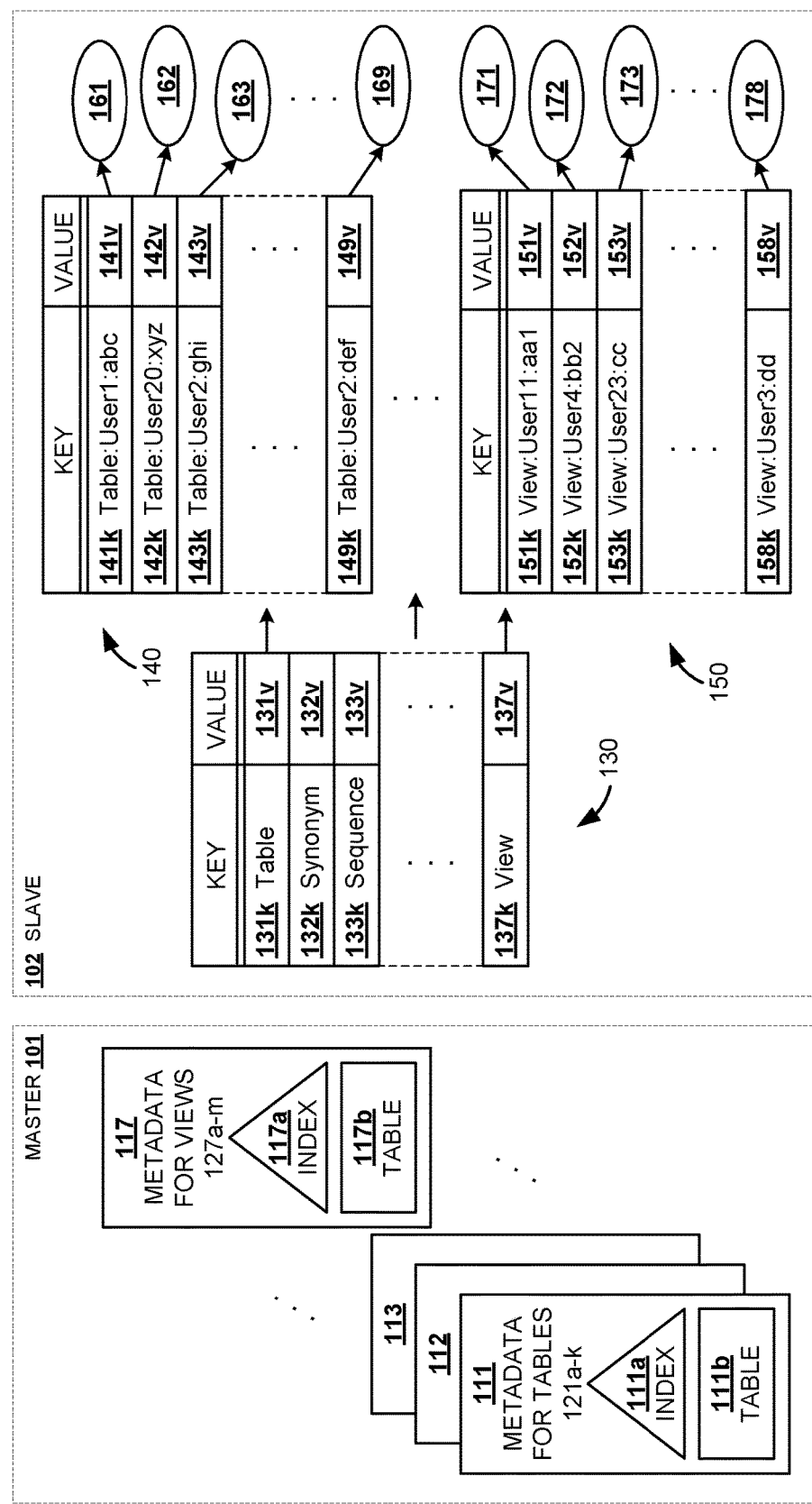
FIG. 1 is a diagram depicting metadata structures at a master node and at a slave node, according to disclosed technologies.

Distributed databases can be implemented in various ways. For example, in SAP HANA, different tables can be assigned to different index servers, which can be running on different hosts. Alternatively, a table can be split so that different rows or columns are stored on different index servers, or a table can be replicated on multiple index servers. The distributed deployment can have metadata for data tables, for views, and/or for other features, attributes, functions, etc. (generally, entities) of the distributed deployment. In some examples, multiple servers can store part or whole of a common table, and it can be desirable for each such server to have its own copy or cache of associated metadata. In examples, a metadata manager of one server can serve as a master metadata manager, while metadata managers of other servers can serve as slave metadata managers. Correspondingly, the master metadata manager controls a master metadata store, while the slave metadata managers control respective slave metadata stores. Slave metadata stores are caches that can contain clones or copies of all or part of the master metadata store. The master and slave metadata stores can be stored alongside or within their respective servers.

In examples, the master metadata store can be implemented using one or more row store database tables, while in other examples, the master metadata store can be implemented using other database tables or other data structures. Database tables provide master metadata with robust, preexisting support for transactions with guarantees, for example, using read/write access including locks, change logs, maintenance, and/or concurrency controls. Guarantees can be provided in the form of the "ACID" properties: atomicity, consistency, isolation, and durability. Providing these guarantees can add significant overhead in the process of managing the database tables; at the same time, these guarantees could also be unnecessary in a slave metadata store. For example, a slave metadata store can be read-only, and accordingly lock support for the slave metadata store can be much simpler than for the master metadata store, or even non-existent.

The disclosed technologies take advantage of the differences in requirements for master and slave metadata stores to implement simpler structures for slave metadata stores and thereby increase the efficiency of slave metadata operations. Particularly, a slave metadata store can be implemented using one or more key-value structures, which can simplify the process of managing metadata at a slave node. Further, the key-value structures can be simply adapted to facilitate multi-version concurrency control, so that out-of-order transactions can be provided with correct metadata according to their respective timestamps.

The disclosed technologies can be extended to multiple slaves and to multiple masters. Two slave nodes of a common master database instance can implement respective key-value metadata stores, which can (but need not) be identical. Particularly, a master metadata table can be cached on one slave node but not on the other. Different sets of metadata items from a single master metadata table can be cached on the two slave nodes. In some examples, a database system can support multiple isolated databases which can have different masters. Thus, a server can have the role of master node for one database but have the role of slave node for another database. In some examples, a slave node can have separate key-value metadata stores for each isolated database, while in other examples, a slave node can maintain multiple isolated key-value structures within a single key-value store.

Definitions

As used in this description, a "table" is a two-dimensional array organized into rows (records) and columns (fields). A table can be a database table used to store application data, or a metadata table used to store metadata about the database environment or entities within the database environment. In examples, a table can be a row store table accessed through an associated index structure which maps keys to respective row identifiers. The index structure can be a B+ tree such as a compressed prefix B+ tree. The table and index structure can support concurrent reads and writes with guarantees. Multi-version concurrency control can be implemented through the use of row-level or record-level write locks and optimistic read locks. Version management, rollback, replays, and disaster recovery can be supported using differential logs. The table can support a range of constraints or integrity checks.

As used in this description, a "key-value structure" is a collection of entries (or tuples), each tuple having of one or more values associated with a key. In examples, a tuple has a key and a single associated value, so the tuple is a 2-tuple or ordered pair which can be dubbed a "key-value pair". Key-value structures can be used to store metadata about a database environment, on one or more slave nodes. In some examples, a key-value structure can be implemented using one or more flat structures, while in other examples, the key-value structure can be implemented using one or more hash tables. A key-value structure can be implemented as read-only from the client side, with updates from a master node supported by a simple tuple-level lock or in some examples no lock at all. Multi-version concurrency control can be supported through the use of organizing metadata objects into linked lists or other sequential data structures. A key-value structure for slave metadata can be implemented without one or more of the constraints, integrity checks, or guarantees that apply for management of a master metadata table. Overall, a key-value metadata structure can be implemented with considerably less overhead than a (master) metadata table, thereby providing improved efficiency and performance with regard to time, processor utilization, and storage space.

As used in this disclosure, a "key-value store" is a collection of one or more key-value structures together with any other structures, objects, etc. (generally, metadata objects) in which slave metadata copies are stored. In some examples only a single key-value structure is used. Where multiple key-value structures are used, the key-value structures can be organized hierarchically into two or more levels, so that a top-level (parent or root) key-value structure matches a prefix of a search key and points to a bottom-level (child or leaf) key-value structure, which matches the entire key and provides the desired value. In some examples, the key-value structures can be organized into two levels, while in other examples, intermediate levels of key-value structures can be implemented, so that the total number of key-value structure levels can be three, four, five, 6-10, or more levels. A key-value structure below the root level is pointed to by a corresponding entry in a parent key-value structure, and can match a further portion of the search key as compared to its parent level. A key-value entry above the leaf level provides link to a subsequent level. A key-value entry at the leaf level provides the target metadata item (e.g., as part of a metadata object) or points to a metadata object containing the target metadata item. In other examples, distinct keys can be used for different levels.

A metadata item can be wrapped (or otherwise associated) with a version number, one or more timestamps indicating a range of validity, and/or a name or other identifier into a metadata object. A metadata object can contain one or more metadata items. A metadata object can be embedded within the value field of a leaf-level key-value entry, or it can be pointed to by a reference in such value field. Metadata objects can be chained in a traversable sequential data structure such as a linked list. In such examples, the head of the sequential data structure can be attached or pointed to directly by the value field of the key-value entry, while other metadata objects in the sequential data structure can be reached from the head and are thus attached or pointed to indirectly.

As used in this disclosure, a "node" is a host computer with one or more processors and attached memory hosting at least part of database instance. The term "master node" (or "slave node") indicates a node acting in the role of a master (or slave) for replication activity.

Example Metadata Architecture

FIG. 1 is a diagram 100 depicting metadata stores at a master node and at a slave node of a database environment, according to disclosed technologies. In the illustration, the master node metadata store 101 contains indexed database tables 111-117 (dubbed "metadata database tables"), which can be managed as database tables with guaranteed transactions; in examples, indexed database tables 111-117 support only transactions with guarantees. The slave node metadata store 102 is a key-value store containing key-value structures 130, 140, 150 along with metadata objects 161-169, 171-178. As described herein, the key-value store 102 can be managed as a lightweight store with low overhead, such as a read-only cache, and can be managed using operations lacking ACID-based guarantees.

At the master node, metadata database table 111 includes an index 111a and an underlying table 111b; metadata database tables 112-117 are similar. In examples, metadata database tables 111-117 can be in-memory row store database tables managed by a database management system ("DBMS") at the master node. As illustrated, metadata database table 111 contains metadata for application-level database tables 121a-k. Metadata database table 117 contains metadata for views 127a-m. Similarly, metadata database tables 112-116 (latter not shown) can contain metadata corresponding to other classes of objects, constructs, features, attributes, etc. (generally, entities) within the database instance on the master node.

At the slave node, slave key-value store 102 contains copies of metadata items for tables, views, and optionally other entities of the master database instance that could be required by the slave node or by clients of the slave node. In the slave metadata store 102, metadata objects 161-169 and 171-178 are attached to hierarchically arranged key-value structures 130, 140, 150. Root-level structure 130 comprises a set of key-value entries 131-137. Each entry is a 2-tuple (or key-value pair) comprising a key (131k-137k) and a value (131v-137v). Key 131k can be "Table" which provides a prefix match for all keys beginning with "Table," such as "Table:User1:abc." In the example shown, value 131v can be a reference, such as a pointer, to leaf-level key-value structure 140, which contains all keys 141k-149k having a "Table" prefix. The corresponding values 141v-149v contain respective references (e.g., pointers) to the corresponding metadata objects 161-169, each of which contain one or more metadata items corresponding to their associated keys.

Similarly, key 137k can be "View:" which provides a prefix match for all keys beginning with "View:" such as "View:User4:bb2." In the example shown, value 137v can be a reference, such as a pointer, to leaf-level key-value structure 150, which contains all keys 151k-158k having a "View:" prefix. The corresponding values 151v-158v contain respective references (e.g., pointers) to the corresponding metadata objects 171-178, each of which contain one or more metadata items corresponding to their associated keys.

Similarly, other entries in key-value structure 130 can have keys 132k, 133k, and so on, providing prefix match to keys having a prefix of "Synonym," "Sequence," and so forth, for different classes, types, categories, etc. of metadata represented in different master metadata tables. The corresponding values 132v, 133v, and so on can point to corresponding leaf-level key-value structures, not shown.

With this disclosure in hand, one of ordinary skill will appreciate that many variations are possible within the scope of the disclosed technologies. Although key-value structures 130, 140, 150 are shown as separate structures, in some examples they can be stacked together to form a single key-value structure, in which (such as value 131v) contains a row number, pointer, or other reference to the corresponding key-value pair (such as {141k, 141v}), and similarly for the other values 132v-137v. Although key-value structures 130, 140, 150 are shown as a hierarchy, this is not a requirement: in some examples, all key entries such as "Table:User2:ghi" or "View:User3:dd" can be collected in a single key-value structure, without any of the entries of parent key-value structure 130. Although metadata objects 161-169, 171-178 are shown outside structures 140, 150, in some examples some or all of the metadata objects 161-169, 171-178 can be directly stored as the respective values within structures 140, 150. Additionally, the slave key-value store 102 can be implemented with more levels, less levels, or non-uniform level depth. For example, a second-level, intermediate (non-leaf) key-value structure can be implemented in which different key-value entries correspond to different "Users" for the "Table" metadata database table. In this example, the key-value entry for "Table:User2" can include a reference to a third-level key-value structure that includes key-value entries for "Table:User2:def," "Table:User2:ghi," and so on. Thus, different third-level key-value structures can be implemented for keys having prefixes "Table:User1 " "Table:User2," and/or "Table:User20." The key-value structure can be organized as a tree, but need not be organized as a tree. For example, "Table:User5" and "View:User5" can resolve to a common third-level key-value structure containing all table and view keys for User5. Thus, key-value structures can form a graph other than a tree.

Likewise, many variations are also possible at the master metadata store 101. For example, instead of being implemented as in-memory row store tables, some or all of metadata database tables 111-117 can be column store tables, disk tables, hybrid tables, or other data structures. One or more metadata database tables can be implemented without an index, or indexes can be shared between metadata database tables. Varying cardinalities can be supported. As shown, metadata database table 111 provides metadata for a plurality of application-level tables 121a-k, but this is not a requirement: any cardinality of relationship between application-level tables and metadata tables can be implemented, including one-to-one, many-to-one, one-to-many, or many-to-many Similarly, any cardinality between views and metadata data tables is possible. Similarly, any cardinality between metadata database tables 111-117 and rows in root key-value structure 130 (or, between metadata database tables and child key-value tables) can be implemented. For example, application-level tables Table_A, Table_B, and Table_C can be supported by a single metadata database table 111, but can have different key-value entries in root key-value structure 130. Cardinality from parent-level key-value entries to child-level key-value structures can be one-to-one or many-to-one.

First Example Method for Building a Key-Value Store

Figure 2:
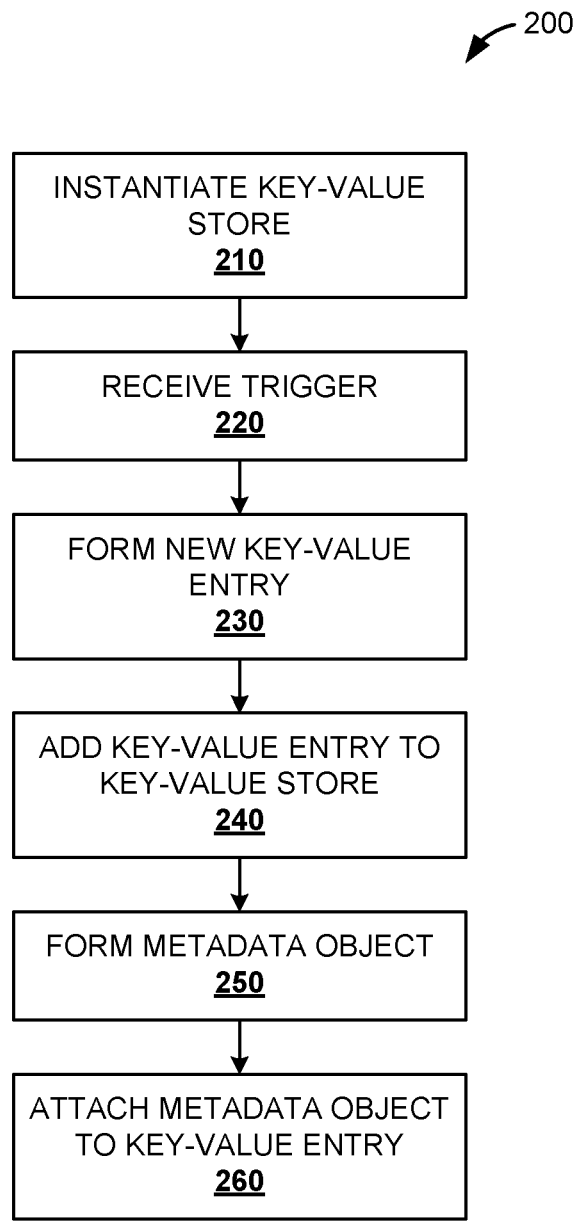
FIG. 2 is a flowchart of a method for building a slave key-value store according to disclosed technologies.

FIG. 2 is a flowchart 200 of a method for building a slave key-value store according to disclosed technologies. As described herein, the slave key-value store can incorporate one or more key-value structures arranged hierarchically or otherwise in a connected graph. The slave key-value store can also incorporate one or more metadata objects attached to corresponding key-value entries in the key-value structures and located in a memory pool locally at the slave node.

At process block 210, a key-value store is instantiated. At process block 220, a trigger is received, for adding one or more metadata items to the key-value store. Responsive to this trigger, a new key-value entry is formed at process block 230 and added to the key-value store at process block 240. A new metadata object containing one or more newly added metadata items is formed at process block 250. Finally, at process block 260, the new metadata object is attached to the new key-value entry. Alternate orderings of process blocks 230-260 can be used. For example, process block 250 for forming the metadata object can be positioned before one or both of process blocks 230, 240. As another example, process block 240 can be deferred until after the metadata object has been attached to the key-value entry, which means that the key-value entry can be left un-modified after it is written.

Returning to process block 210, instantiation of the key-value store can include instantiation of one or more key-value structures within the key-value store. In some examples, the key-value store consists of a single key-value structure with entries for all slave metadata items. This key-value structure can be instantiated as an empty structure, or it can be pre-filled with key-value entries for some known metadata items. In other examples, the key-value store is designed as a hierarchical collection of key-value structures, which provides for more efficient look-up as compared to a single (and potentially large) key-value structure. In some examples, hierarchical key-value structures can distribute contention (such as lock contention) between clients or between a client and a master. In such examples, instantiation of the key-value store can include creation of a parent key-value structure and optionally one or more child key-value structures. For each child key-value structure created, a parent key-value entry can be created in the parent key-value structure with a reference to the associated child key-value structure.

At process block 220, a trigger is received, for adding one or more metadata items to the key-value store. In varying examples, different triggers can be used. In some examples, copying all or part of an application-level database table, a view, or other construct of the master database instance onto the slave node can be used as a trigger to propagate associated metadata. In other examples, a housekeeping, user, or system event can be used as a trigger to copy new or modified metadata from the master node to the slave node. In further examples, a request for a metadata item not already present in the slave metadata store can be used as a trigger to add that metadata item.

At process block 230, a new key-value entry is formed. The key-value entry can include a key field which is used to identify the key-value entry and can be searched for to find a key-value entry and metadata object matching a particular search key. The key field can be an identifier of the master metadata item for which the key-value entry is intended. The identifier can be a text name, and can be a qualified name. The key-value entry can further include a value field which is associated with a metadata object, as described further below.

At process block 240, the new key-value entry for a new metadata item is added to the key-value store. The new key-value entry can be added to a sole key-value structure where only one key-value structure is present, or it can be added to an appropriate child key-value structure depending on what the metadata item pertains to. For example, a view metadata item can be added to a child key-value structure for view metadata, such as 150, and a table metadata item can be added to a child key-value structure for table metadata, such as 140. In some examples, the new key-value entry can be added at the end of the key-value structure, while in other examples, the key-value structure can be maintained in sorted order, and the new key-value entry can be added at its sort position within the key-value structure. In further examples, the key-value structure is maintained as a hash table, and adding the key value entry can include computing a hash of its key to obtain a hash address and writing the key-value entry or a pointer to the key-value entry at the hash address. A collision resolution mechanism can be implemented to handle hash collisions. In examples, the key-value entry can include additional fields, for example, a field for a timestamp at which the associated metadata item was updated on the master node.

At process block 250, the new metadata object is formed. In examples, forming the new metadata object includes: retrieving the desired metadata item from the master node, packaging the retrieved (copy of the) metadata item into a metadata object, and storing the metadata object at the slave node. In various examples, the metadata object can be identical to the retrieved metadata item, or can include additional attributes such as one or more timestamps, size of the metadata object, a forward reference to a succeeding metadata object, or a name or other identifier. The metadata object can be stored in a memory pool, or in a data structure such as a linked list or an array of metadata objects.

At process block 260, the new metadata object is attached to the new key-value entry. In examples, this is achieved by writing a pointer or other reference to the metadata object into the value field of the key-value entry. In other examples, the value field of the added key-value entry can hold the copy of the metadata item itself, which is part of the metadata object. In other examples, the value field can hold some other type of reference (not a pointer) to the metadata object, which is a property of the metadata object, such as an address or name, that can be used to locate and retrieve the metadata object. In examples, where the metadata object has not yet been built or stored, the value field of the key-value field can be left blank at process block 230, while in other examples with different ordering of process blocks, the copy of the metadata item or the metadata object's address can be inserted into the key-value entry at process block 230 itself.

Although FIG. 2 shows formation of a single key-value entry and attached metadata object at process blocks 230-260, a plurality of new key-value entries and respective metadata objects can be added to the key-value store as a result of a single trigger event, or at other times during the lifecycle of the slave key-value store. Where multiple entries and metadata objects are added, the same process blocks 230-260 are followed for each entry-metadata object pair. The various entry-metadata object pairs can be added sequentially, in parallel, in batches, or in any combination thereof.

Second Example Method for Building a Key-Value Store

Figure 3:
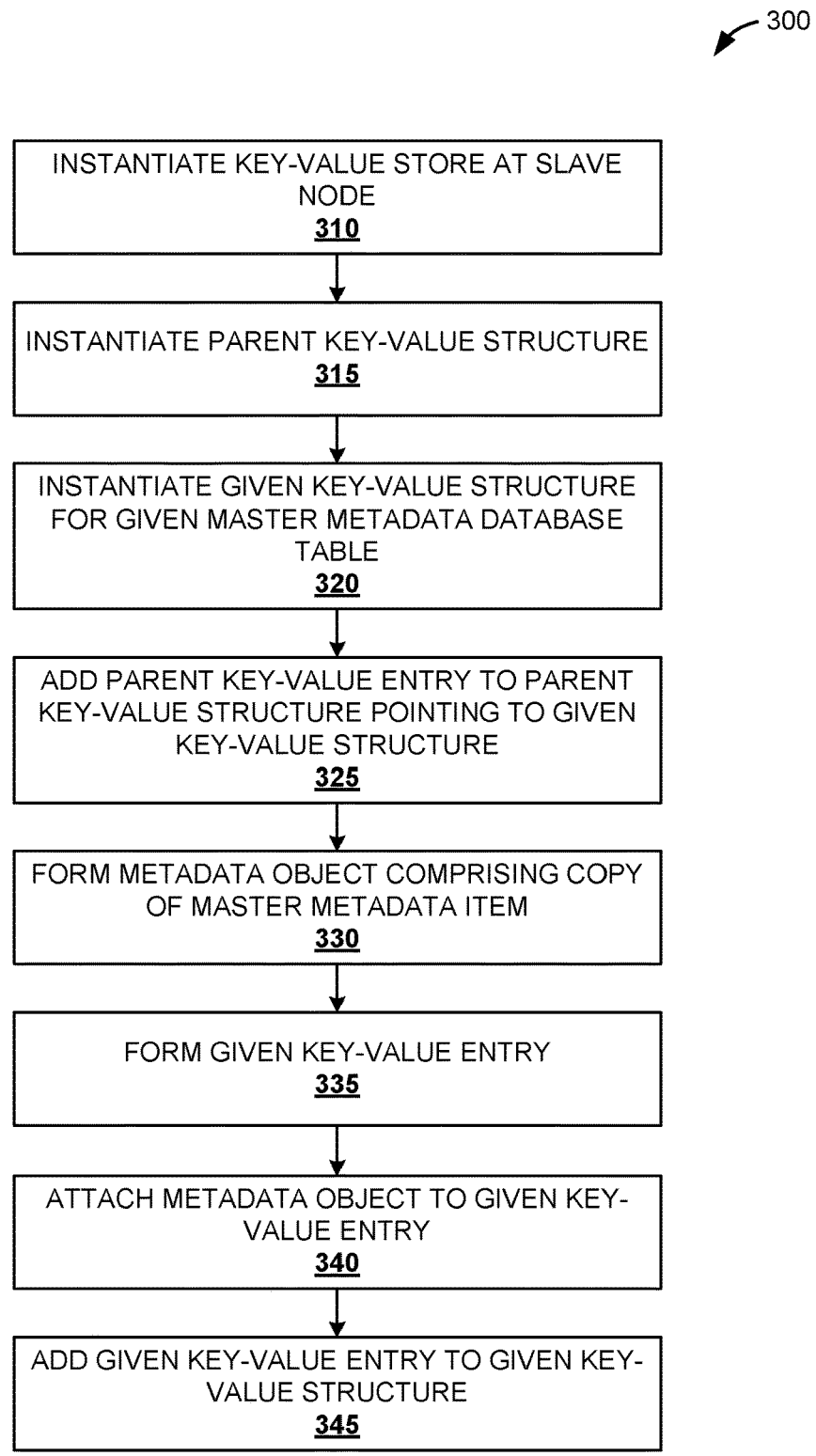
FIG. 3 is a flowchart of another method for building a slave key-value store according to disclosed technologies.

FIG. 3 is a flowchart 300 of another method for building a slave key-value store according to disclosed technologies. While similar in some respects to flowchart 200, flowchart 300 shows certain details of instantiating a multi-level key-value store, and has a different ordering of operations equivalent to process blocks 230-260.

At process block 310, an empty key-value store is instantiated at a slave node. At process block 315, an empty parent key-value structure is instantiated within the key-value store. At process block 320, an empty child key-value structure is instantiated within the key-value store, corresponding to a given master metadata database table. In examples, each child key-value structure can cache metadata from a different respective master metadata database table. However, not all master metadata database tables need be cached on a given slave node. At process block 325, a parent key-value entry is added to the parent key-value structure with a key field identifying the child key-value structure or the given master metadata database table. The value of the parent key-value entry can be set to reference the child key-value structure.

To add a copy of a master metadata item to the slave metadata store, at process block 330 the metadata item copy is retrieved from the master node and a metadata object is formed containing the copied metadata item. At process block 335, a given key-value entry is formed, having a key representative of the metadata item. At process block 340, the metadata object is attached to the given key-value entry, for example, by setting the value field of the key-value entry to an address or other reference of the metadata object. Then, at process block 345, the given key-value entry is added to the child key-value structure, as described herein.

First Example Method for Metadata Item Retrieval

Figure 4:
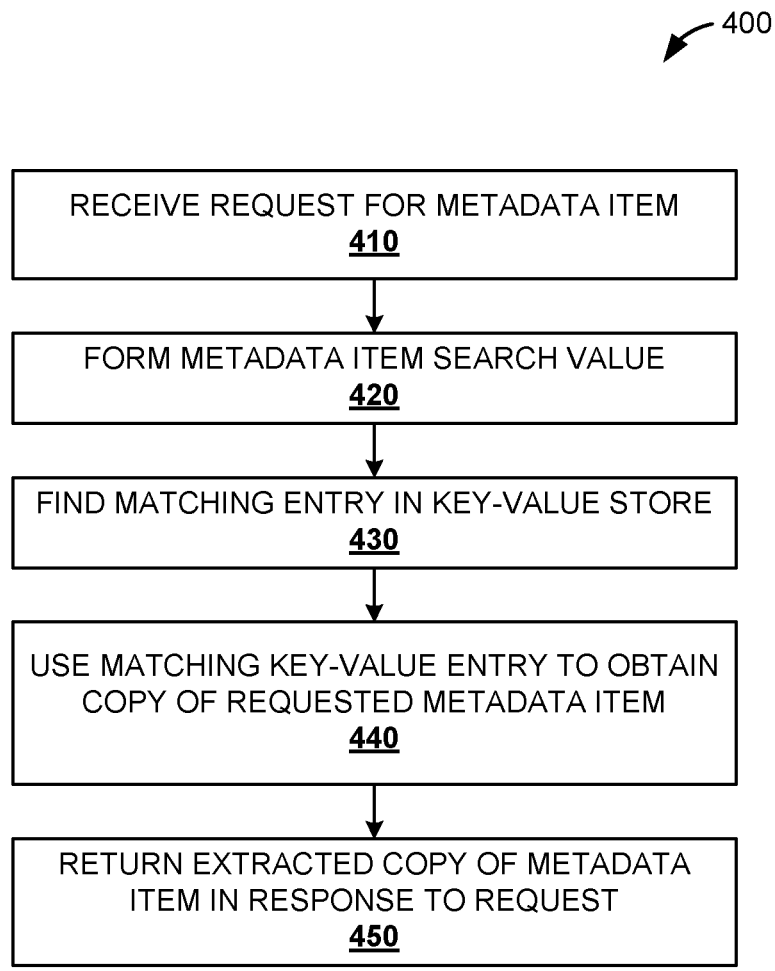
FIG. 4 is a flowchart of a method for processing a metadata request according to disclosed technologies.

FIG. 4 is a flowchart 400 of a method for processing a metadata request according to disclosed technologies. As described below, a search key corresponding to the metadata request is determined, and used to find the requested metadata item.

At process block 410, a request is received at a slave node for a metadata item. For purposes of illustration, this can be a metadata item whose copy is stored in metadata object 161 and associated with a key-value entry {141k, 141v}. The request can include a name of the desired metadata item, which can be a bare name "abc" or a qualified name such as "Table:User1:abc" or "User1:abc."

At process block 420, a metadata item search value is formed, based at least partly on the request. The metadata item search value can be a text string such as a qualified name, e.g., "Table:User1:abc." At process block 430, a match for the metadata item search value is sought among the keys of the child key-value structure.

In some examples, a key lookup in a key-value structure can be implemented by a serial traversal of the key-value structure, while in other examples having sorted keys, a binary search can be used. In further examples, a key-value structure can be implemented as a hash table, in which case lookup can be performed by computing a hash of a search value and using the hash as an index into the hash table.

Then, at process block 440, the value (e.g., 141v) is retrieved from the matching key-value entry in the key-value structure, and used to obtain the copy of the requested metadata item from a metadata object. In examples, the retrieved value can be a direct or indirect reference to the desired metadata object (e.g., 161) which contains the copies of the one or more desired metadata items. Finally, at process block 450, the copy of the desired metadata item is returned in response to the original request.

Second Example Method for Metadata Item Retrieval

Figure 5:
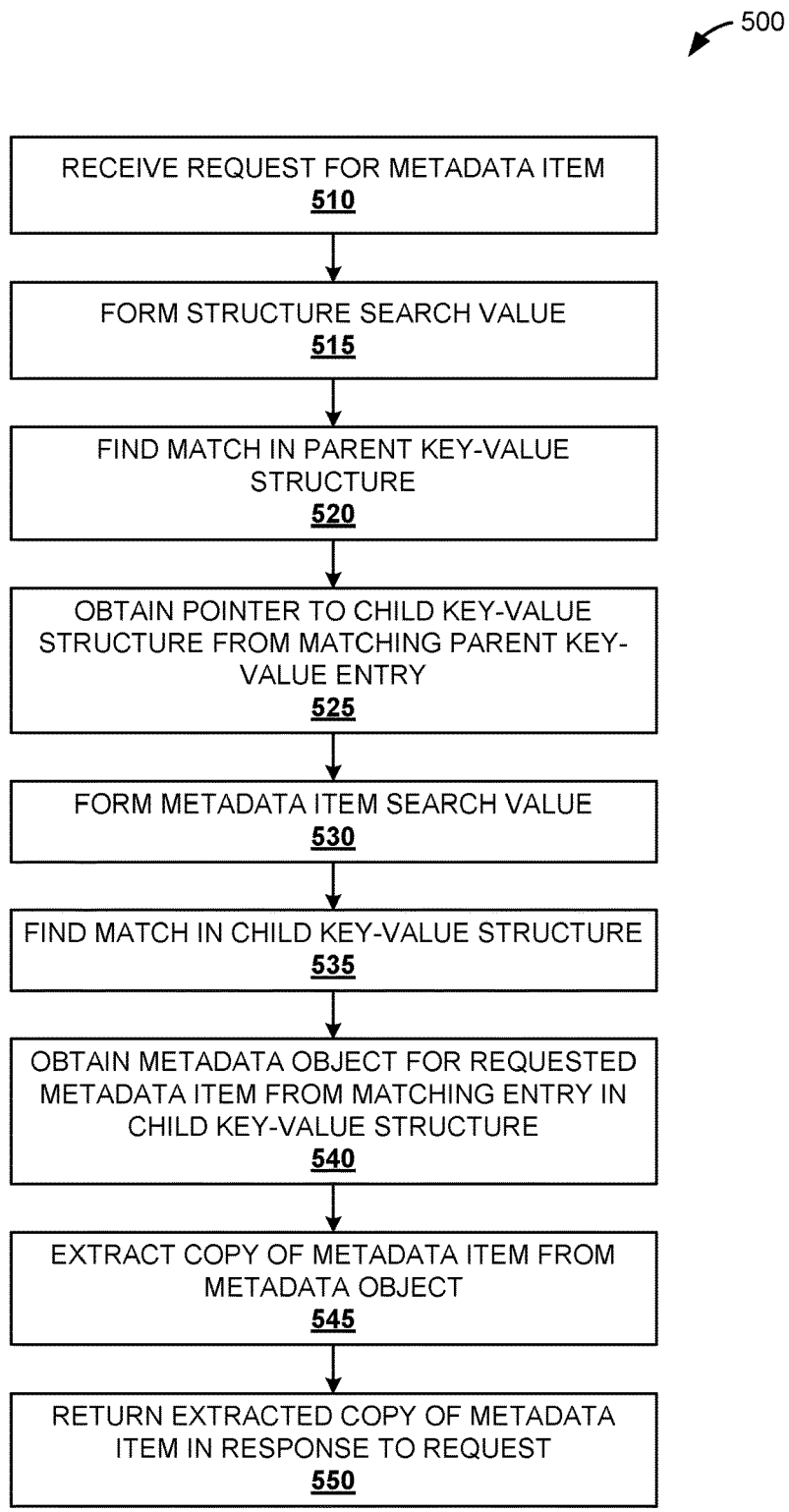
FIG. 5 is a flowchart of another method for processing a metadata request according to disclosed technologies.

FIG. 5 is a flowchart 500 of a second method for processing a metadata request according to disclosed technologies. As described below, this method determines a search key corresponding to the metadata request, and uses the search key to find the requested metadata item.

At process block 510, a request is received at a slave node for a metadata item. For purposes of illustration, this can be a metadata item whose copy is stored in metadata object 161 and associated with a key-value entry {141k, 141v}. The request can include a name of the desired metadata item, which can be a bare name "abc" or a qualified name such as "Table:User1:abc" or "User1:abc." At process block 515, a structure search value is formed, based at least partly on the request. The structure search value can be, e.g., "Table" or "Table:User1:abc." At process block 520, a prefix match for the structure search value is sought in a root-level key-value structure similar to 130. In different examples, the match can be an exact match to, e.g., "Table" or a partial match to, e.g., "Table:User1:abc." At process block 525, the value (e.g., 131v) is obtained from the matching entry of the root key-value structure; this value contains or provides a reference to a child key-value structure similar to 140.

At process block 530, a metadata item search value is formed, based at least partly on the request. The metadata item search value can be a text string such as a qualified name, e.g., "Table:User1:abc." At process block 535, a match for the metadata item search value is sought among the keys of the child key-value structure. Once found, the matching key-value entry can be used to get the copy of the requested metadata item. At process block 540, the value (e.g., 141v) is retrieved from the matching key-value entry in the child key-value structure, and used to retrieve a metadata object. In examples, the retrieved value can be the copy of the desired metadata item itself, copies of a plurality of desired metadata items, a desired metadata object containing one or more copies of desired metadata items, or a direct or indirect reference to the desired metadata object (e.g., 161) which contains the one or more copies of desired metadata items.

Finally, at process blocks 545 and 550, the copy of the desired metadata item is extracted from the metadata object and returned in response to the original request. Alternatively, in some examples, the metadata object can be returned intact in response to the request.

Example Methods for Lazy Filling of a Key-Value Store

In the description above, matching keys have been presumed to be present at process blocks 520 and 535. In some examples, the slave key-value store can be managed so that the key-value store is proactively built and maintained and matching entries are always present, except possibly under fault conditions. In other examples, the slave key-value store can be built and populated on a lazy, on-demand basis, and matching entries could be absent at the time of a metadata request.

Figure 6:
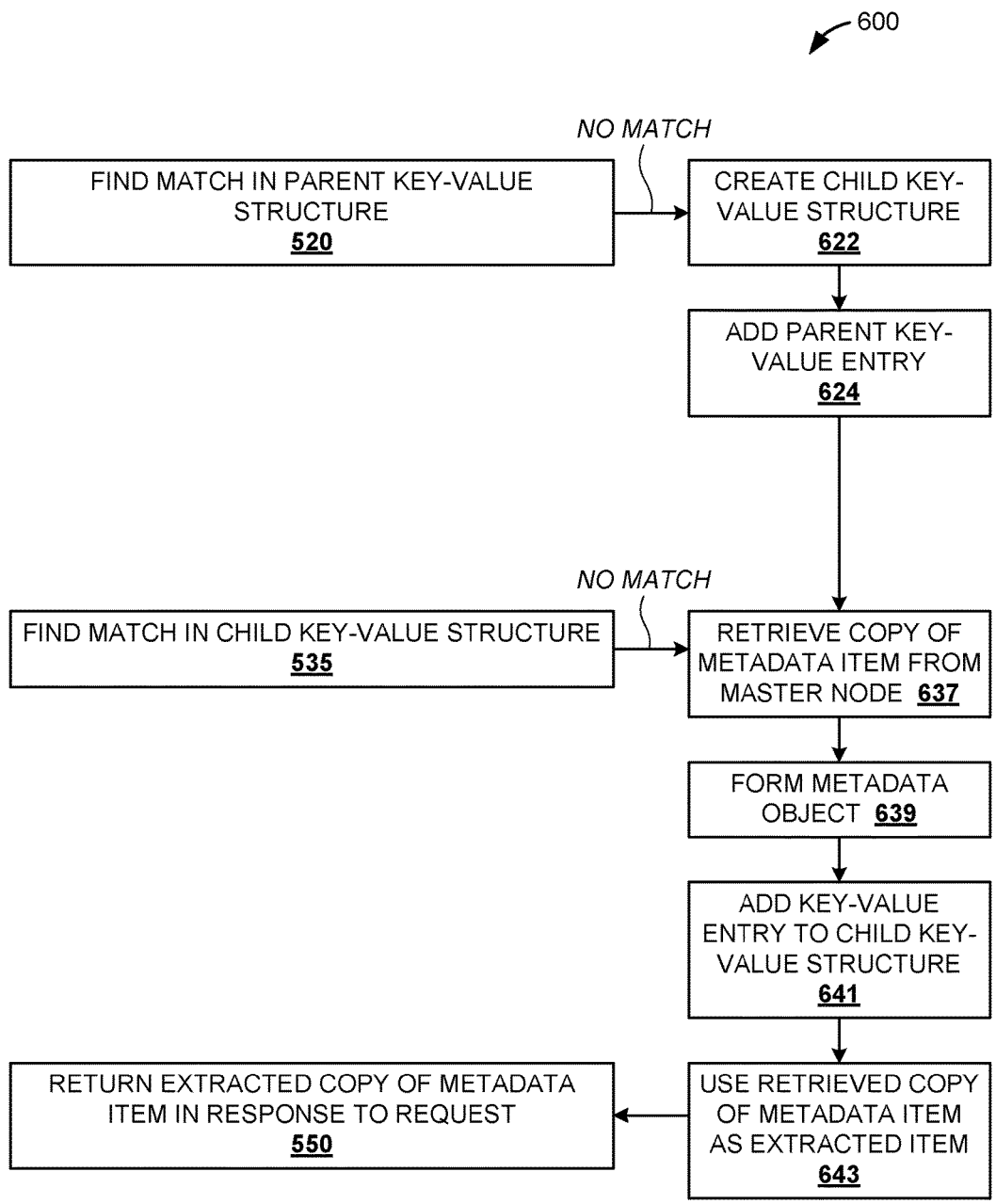
FIG. 6 is a partial flowchart depicting methods for lazy filling of a key-value store according to disclosed technologies.

FIG. 6 is a partial flowchart 600 depicting methods for lazy filling of a key-value store according to disclosed technologies. Process blocks 520, 535, and 550 are kept intact from FIG. 5, and additional process blocks are shown for handling the no-match conditions.

To handle examples with no-match found at process block 535, a decision branch can be incorporated within process block 535. If a match was found at process block 535, then the method continues as described to process block 540. Otherwise, in the no-match case, the method proceeds to process block 637, where the copy of the requested metadata item can be retrieved from the master node. Then, at process block 639, the corresponding metadata object can be built. At process block 641, a new key-value entry for the requested metadata item is added to the child key-value structure, with the metadata object being attached to the new key-value entry, similar to the description of FIG. 2 above. Using the copy of the retrieved metadata item in place of the extracted copy of the metadata item (process block 643), the method can return to process block 550, where the copy of the metadata item is returned in response to the request received at process block 510. In this manner, the request for a metadata item absent from the slave key-value metadata store results in (i) adding the copy of the requested metadata item to the slave metadata store, and (ii) response to the request with the copy of the requested metadata item.

Similarly, in some examples, a matching entry in the parent key-value structure could be absent at process block 520. To handle examples with no-match found at process block 520, a decision branch can be inserted within process block 520. If a match was found at process block 520, then the method continues as described to process block 525. Otherwise, in the no-match case, the method proceeds to process block 622, where a new child key-value structure is created. Then, at process block 624, a new key-value entry can be added to the parent key-value structure and attached to the newly built child key-value structure. Since the new child key-value structure can be empty at this point, a no-match condition can be expected at process block 535. Accordingly, the method can proceed directly to process block 637 for handling a missing key-value entry as described above, bypassing process blocks 525, 530, 535. In this manner, the request for a metadata item belonging to a non-existent key-value structure results in creation and attachment of the missing key-value structure, followed by handling of the missing metadata item as described above.

Example Multi-Version Support

Figure 7:
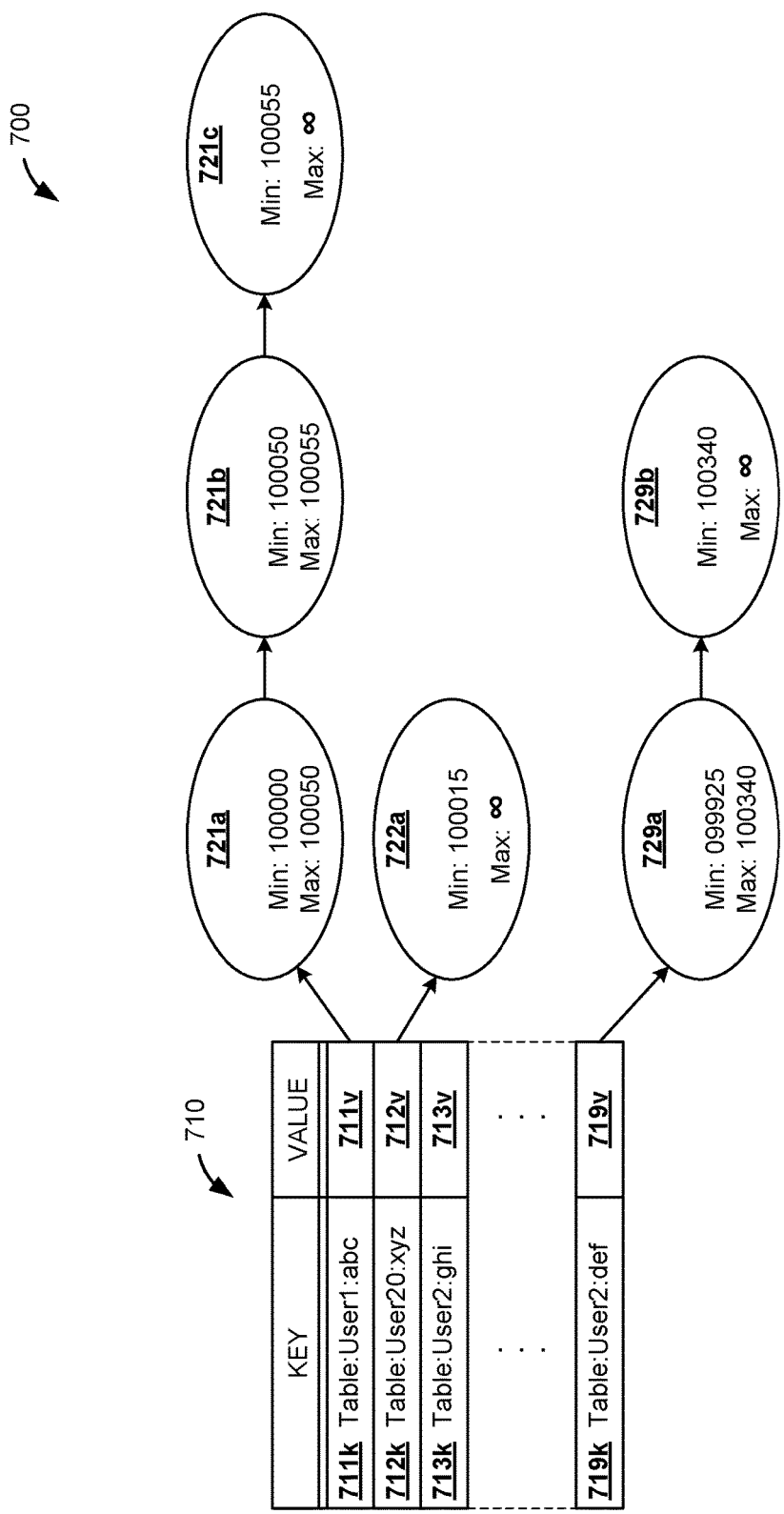
FIG. 7 is a diagram depicting organization of slave metadata according to disclosed technologies.

FIG. 7 is a diagram 700 depicting organization of slave metadata according to disclosed technologies, including multi-version support. As described herein, key-value structure 710 is a structure that can be used to match keys 711*k*-719*k* and determine respective values 711*v*-719*v*. As illustrated, metadata objects 721*a*-721*c* form a linked list for one of the key-value entries {711*k*, 711*v*} of the key-value structure 710. Each metadata object incorporates two timestamps, which indicate a transaction timestamp range for which the metadata object is presumed to be valid. In this example, "Min: 100000" and "Max: 100050" in metadata object 721*a* indicate that metadata object 721*a* is valid for transaction timestamps in the range [100000, 100050), where square brackets [ ] denote a closed interval endpoint and parentheses ( )denote an open interval endpoint. Similarly, metadata object 721*b* is valid for transaction timestamps in the interval [100050, 100055). Finally, metadata object 721*c* is valid for transaction timestamps≥100055.

These timestamps can be understood as follows. Metadata object 721*a* was originally tagged as valid over [100000, ∞), until a metadata update was received from the master node with timestamp 100050. At this point, new metadata object 721*b* was formed with validity [100050, ∞) and chained to previous metadata object 721*a*, with metadata object 721*a* having its "Max" validity tag "Max:∞" replaced by "Max: 100050" to reflect the metadata update In this way, metadata object 721*a* is retained intact for older transactions having timestamps <100050, and new metadata object 721*b* is available for later transactions having timestamps ≥100050. A similar metadata update at 100055 causes newer metadata object 721*c* to be chained to metadata object 721*b*, with the "Max:" tag of metadata object 721*b* being updated to 100055. In the illustration shown, no newer metadata update has been made to the copies of metadata item represented by metadata objects 721*a*-721*c*. Although new metadata object 729*b* was added with timestamp 100340, this pertains to a different metadata item and does not affect the chain or linked list of metadata objects 721*a*-721*c*. In examples, successive metadata objects in a chain can have successively later ranges of timestamp validity.

Although described as a linked list, the chain 721*a*-721*c* can be implemented in various ways. For example, the metadata objects 721*a*-721*c* can be implemented as a vector or contiguously stored array, without some of the overhead associated with a linked list structure. In other examples, metadata object 721*b* can be implemented as a change or delta relative to its preceding metadata object 721*a*.

As illustrated, entry value 711*v* points to the head of the chain or linked list 721*a*-721*c*, which allows updates to be made without breaking any links or changing the value 711*v*. In other examples, the chain 721*a*-721*c* can be organized so that value 711*v* points to the tail (most recent) metadata object, 721*c* (or, alternatively, new metadata object versions are added to the head of the list). Such an arrangement provides greater efficiency for newer requests (having newer transaction timestamps).

As illustrated, each metadata object contains two timestamps representing the beginning and end of its valid timestamp range. However, this is not a requirement of the disclosed technologies. In examples, only the ending timestamp is included in the metadata object; the beginning timestamp can be inferred from the ending timestamp of a previous metadata object; a beginning timestamp for the head object 721*a* can be superfluous, since all transactions preceding the actual beginning timestamp value are known to have been cleared from the database system. In other examples, only the beginning timestamp is included in the metadata object; the ending timestamp can be inferred from the beginning timestamp of the succeeding metadata object, and can be taken to be ∞ (infinity) if there is no succeeding metadata object. The timestamp value(s) for a metadata object can be maintained as part of the metadata object or maintained separately outside the metadata object. Similarly, the reference (e.g., pointer) to a next metadata object in a chain can be maintained as part of the metadata object or maintained separately outside the metadata object. Other attributes (not shown) such as size of a metadata object can also be maintained.

Regardless of the organization of the chain 721*a*-721*c*, a housekeeping operation can purge old metadata objects when all transactions having timestamps below their Max tags have been completed or cleared from the database environment. For example, the chain 721*a*-721*c* could have had earlier metadata objects with Min tags of 050000, 063000, and so on, which were removed by a housekeeping operation at 100005. At timestamp 100005, metadata objects 721*a*, 722*a*, and 729*a* were still current, and could not be removed, while metadata objects 721*b*-721*c* and 729*b* had not yet been created. Purging of old metadata objects can happen periodically (e.g., according to a schedule) or on demand in response to a condition (e.g., low memory).

Third Example Method for Metadata Item Retrieval

Figure 8:
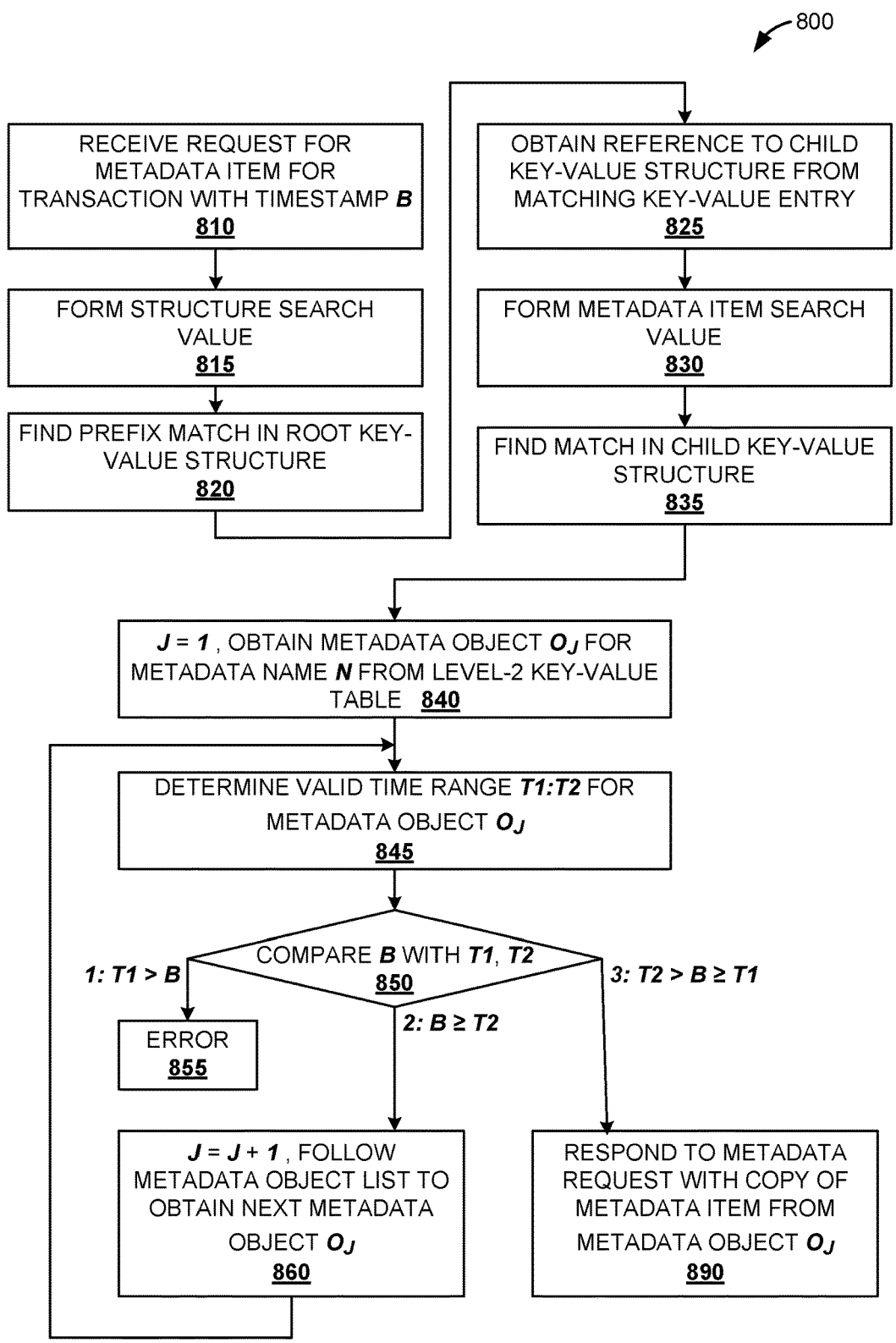
FIG. 8 is a flowchart of a method for processing a metadata request according to disclosed technologies.

FIG. 8 is a flowchart 800 of a third method for processing a metadata request according to disclosed technologies. Process blocks 810-840 are similar to process blocks 510-540 described earlier; additional operations in FIG. 8 are directed to traversing a list of metadata objects similar to 721*a*-721*c* to obtain the correct metadata object based for a timestamp of the metadata request.

At process block 810, a request is received at a slave node for a metadata item for a transaction having timestamp B. The structure search value can be determined at process block 815 similar to process block 515. Process blocks 820, 825, 830, 835 are similar to process blocks 520, 525, 530, 535 described earlier, in which two levels of key-value structures are traversed to find a key-value entry whose key matches the metadata item search value.

Then, at process block 840, the value of the matching key-value entry, which can be a pointer, is followed to a metadata object (e.g., 721*a*) at the head of a list of metadata objects. In some examples, the list of metadata objects has a single member (e.g., 722*a*), while in other examples, the list of metadata objects can have two (e.g., 729*a*-729*b*), three (e.g., 721*a*-721*c*), or even more metadata objects. At process block 840, a list position counter J can be set to 1, indicating that the method is at the head of the list of metadata objects. The metadata objects of the list can be denoted according to link position, e.g., $O_J$; thus, the first metadata object is simply $O_1$. The description proceeds in terms of the list position counter J for the sake of illustration, although one of ordinary skill will appreciate that an implementation of flowchart 800 can omit the list position counter J.

The method proceeds to process block 845, where the valid time range [T1, T2) can be determined from tags associated with or incorporated within metadata object $O_J$. Then, at process block 850, the request timestamp B is compared with T1 and/or T2. If T1>B, then the method follows branch 1, and proceeds to report an error at process block 855. The reason for this is that the first metadata object has the lowest timestamp range in its linked list; if B<T1, there cannot be another metadata object which is valid for timestamp B. Alternatively, there could have been an earlier metadata object that was purged during housekeeping. This too can be reported as an error, because the earlier metadata object should not have been purged until after all transactions with timestamp B have been completed or cleared. In some examples, T1 is always 0 for the first metadata object, so B is never less than T1.

Examining other cases at process block 850, if B≥T2, then branch 2 is followed to process block 860. In examples, the condition B≥T2 means that a metadata update has occurred and that a newer metadata object is present. Therefore, list position counter J is incremented, and the list is followed to the next metadata object $O_J$, whereupon the method loops back to process block 845.

The remaining case at process block 850 is for T2>B≥T1, for which branch 3 is followed to process block 890. Because timestamp B is within the range of validity for $O_J$, a copy of a metadata item from the metadata object $O_J$ can be returned, in response to the metadata request received at process block 810. As described herein, rather than returning the entire metadata object $O_J$, in some examples one or more metadata values can be extracted from the metadata object $O_J$ at process block 890, and the extracted metadata values can be returned instead of the entire metadata object $O_J$.

Examples of Metadata Pruning

FIGS. 9A-9F are diagrams illustrating methods of pruning an obsolete metadata object version. Pruning can be desirable when it is determined that all transactions earlier than some timestamp have been completed or otherwise cleared from the database system. Pruning can be performed periodically (e.g., according to a schedule) or on demand in response to a condition (e.g., low memory).

Figure 9A:
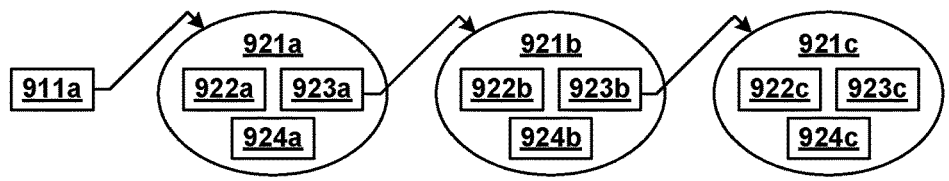
FIGS. 9A-9F are diagrams illustrating methods of pruning an obsolete metadata object version, according to disclosed technologies.

FIG. 9A depicts a chain of metadata objects 921*a*-921*c* similar to the chain of metadata objects 721*a*-721*c* described above. Each metadata object 921*i* (for i ∈ {a, b, c}) contains metadata item 922*i*, a forward pointer 923*i*, and timestamp range data 924*i*. Forward pointer 923*a*, 923*b* point to 921*b*, 921*c* respectively; forward pointer 923*c* at the end of the chain can be set to a null pointer or some other indication of end-of-chain. Pointer 911*a* is a pointer in the associated key-value entry's value field, similar to 711*v* described above.

At some time, a determination is made that metadata object 921*a* is obsolete, and a housekeeping task is set to dissociate metadata object 921*a* from the associated key-value entry and from the other metadata objects from the chain. As used in this description, "dissociation" of a metadata object from its key-value entry refers to any operation or combination of operations that results in metadata object being unreachable from the key-value entry.

Figure 9B:
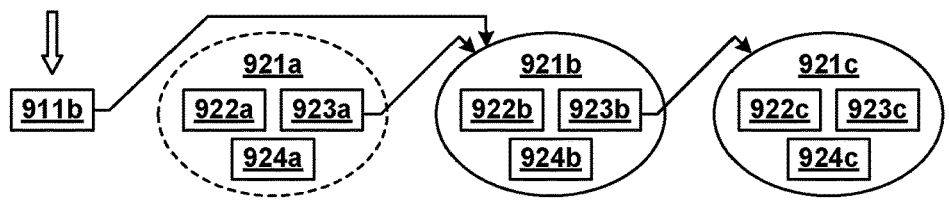
Figure 9C:
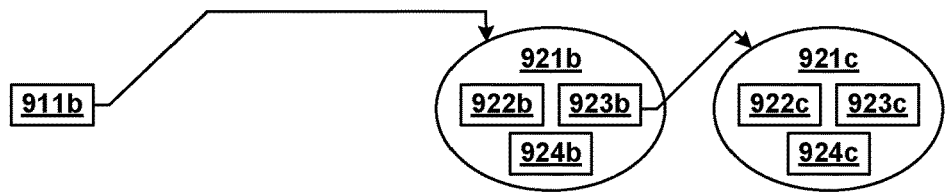

In a first dissociation method, FIG. 9B shows the key-value entry pointer 911*a* being changed to pointer value 911*b* which points to metadata object 921*b*. Although metadata object 921*a* is still present, it is now unreachable from the key-value entry, and has thus been dissociated from the key-value entry. Since metadata object 921*a* is unreachable (sometimes denoted as orphaned, and shown by dashed outline), it can be deleted during a garbage collection operation, leaving the key-value entry and metadata object chain in the state shown in FIG. 9C. In this method, dissociation is performed by a single pointer modification in the key-value entry.

Figure 9D:
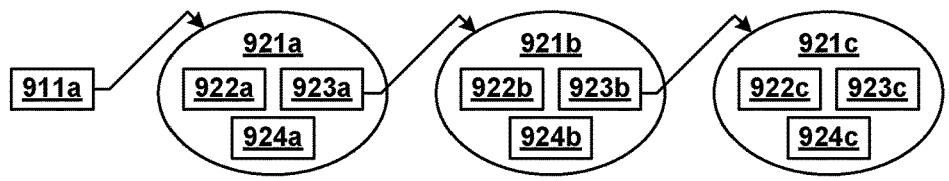
Figure 9E:
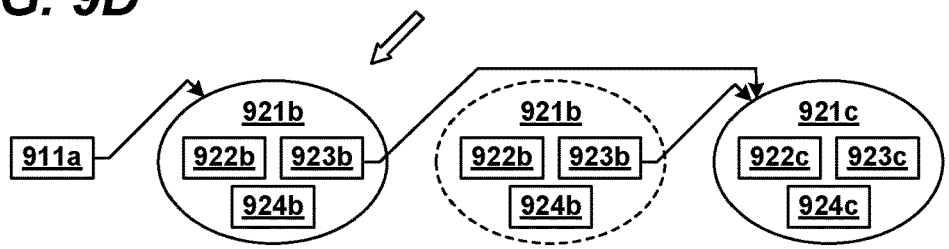
Figure 9F:
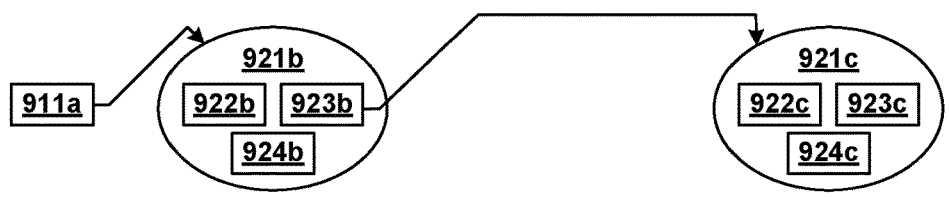

FIGS. 9D-9F depict a second dissociation method. FIG. 9D represents the same starting configuration as FIG. 9A. FIG. 9E shows metadata object 921*a* having been overwritten with the contents of metadata object 921*b*. The new copy of metadata object 921*b* is in the same location as the earlier metadata object 921*a*, and is properly pointed to by pointer 911*a*. Further, the new copy of metadata object 921*b* contains pointer 923*b* which properly points to metadata object 921*c*. Thus, the overwriting operation leaves the chain of metadata objects intact, from key-value entry to object 921*b* to object 921*c*. Since the original metadata object 921*a* has been overwritten, it cannot be reached from the key-value entry and has been dissociated from the key-value entry. The original copy of metadata object 921*b* is now orphaned and unreachable, and can be deleted during a garbage collection operation, leaving the key-value entry and the metadata object chain in the state shown in FIG. 9F. In this method, dissociation is performed without modification of the key-value entry.

Example Metadata Update

Figure 10:
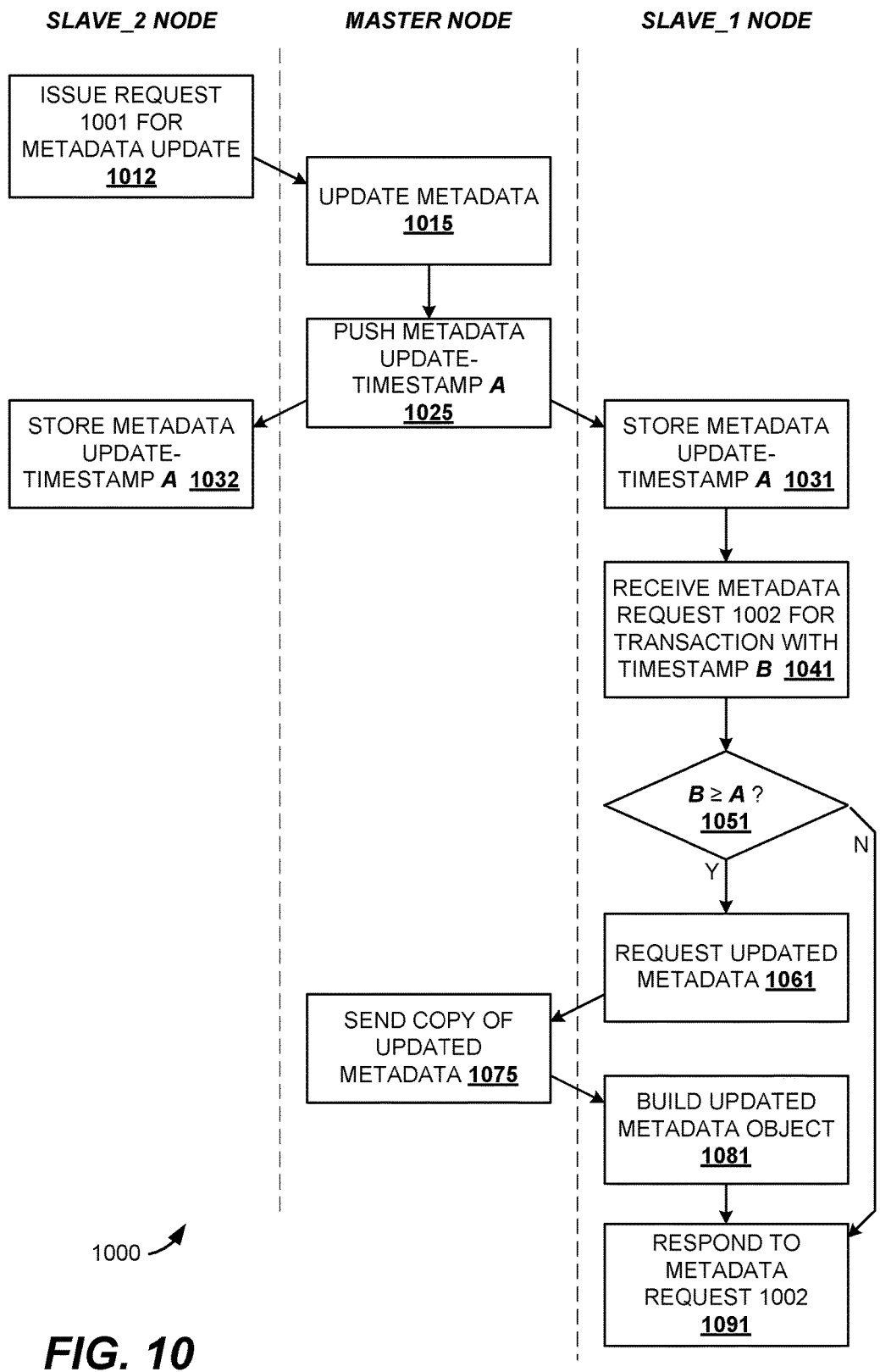
FIG. 10 is a flowchart of a method for updating metadata according to disclosed technologies.

FIG. 10 is a flowchart 1000 of a method for updating metadata according to disclosed technologies. Flowchart 1000 is divided into swim lanes indicating actions occurring at a master node and two slave nodes of a database environment, the slave nodes being denoted as Slave_1 and Slave_2. These nodes can be roles relative to a particular application-level table of the database environment; in examples, different nodes of a database environment can be masters for different application-level database tables.

At process block 1012, the Slave_2 node issues a request 1001 for updating a particular metadata item. The Master node receives the request 1001 and updates the metadata item at process block 1015. The metadata item update is associated with a last-update timestamp A which, in examples, can originate from the Slave_2 node, from the Master node, or from another node at which a transaction or other event led to the request 1001. At process block 1025, the last-update timestamp A is pushed as a push notification to at least those nodes having copies of the updated metadata item. The push notification is received at both Slave_1 and Slave_2 nodes, which store the last-update timestamp A at process blocks 1031 and 1032 respectively.

Subsequently, at process block 1041, a request 1002 for the same metadata item is received at the Slave_1 node, the request having timestamp B. At process block 1051, request timestamp B is compared with last-update timestamp A. If B≥A, then the Y branch is followed, and updated metadata is requested from the Master node at process block 1061. At process block 1075, the Master node receives the request and responds with a copy of the updated metadata item. In some examples, the copy of the updated metadata item is provided from the Master node to the Slave_1 node in a transmission format, while in other examples, the updated item is provided in a metadata object format used on the Slave_1 node, and in further examples, the updated item is provided in the format used within the master metadata table in which the master item is stored. At process block 1081, the copy of the updated metadata item is received and incorporated into an updated metadata object, which can be integrated into the metadata key-value store on Slave_1. At process block 1091, the copy of the updated metadata item is used to respond to the metadata item request 1002.

Alternatively, if B<A is determined at process block 1051, then no metadata update is required, and the N branch is followed directly to process block 1091. A metadata object already present on the Slave_1 node is used to respond to the metadata item request 1002.

Additional Features

1. Metadata Examples

The disclosed technologies are applicable to a wide range of metadata. Metadata items can pertain to any sort of application-level database table in the master database environment including, for example, column store tables, row store tables, alert tables, application-specific tables, application tables, BIMC tables, cluster tables, converter tables, cubes, data sources, data targets, decision tables, dictionary mapping tables, dimensional tables, disk tables, extended tables, extraction result tables, fact tables, flexible tables, hybrid tables, link tables, logical tables, in-memory tables, measurement tables, monitored tables, partitioned tables, persisted tables, pivot tables, pooled tables, remote tables, repository tables, runtime tables, series data tables, system tables, temporary tables, translation tables, and/or virtual tables.

Additionally, metadata items can describe attributes of, or otherwise support, other entities of the master node database instance. Stored metadata can pertain to any of: ABAP dictionaries, application descriptors, application programming interface (API) procedures, definitions of local or remote data sources, dependencies between software objects, files, folders, key figures, locks, software object versions, packages, plugins, procedures, privileges, queues, repositories, schemas, sequences, services, synonyms, text objects, translation functions, users, versions, or views. Particularly, a metadata item can include one or more elements each describing a user table, a table partition, a table replica, or a database view.

A view can be a result of a stored application-level query on a database instance, representing combinations and sub-combinations of parts of one or more application-level database tables. A view can be implemented as read-only or as updatable. A view can have virtual or non-virtual (sometimes dubbed "materialized") implementation.

2. Read-only Cache

Portions of the key-value store described herein (especially metadata objects) can be implemented as a read-only cache, which facilitates lightweight, fast, and efficient operation of the slave metadata store. Different read-only variants are within the scope of disclosed technologies. In all variants, there is no possibility of write conflict, which simplifies the store implementation.

In some examples, a read-only object is one that can be created and deleted but cannot be modified. Key-value entries can have such a read-only property. Once created, there is no need to modify a key-value entry. Changes to metadata object versions, including deletion of obsolete versions or updates to add new metadata object versions, can be performed entirely by operations on the metadata objects (as opposed to changing items inside a metadata object). Key-value entries can also be deleted when the item to which the metadata item pertains (such as an application-level database table or view) is removed from the slave database instance.

In other examples, a read-only object is one that offers a read-only client interface, but can be written or modified by a sole owner, which can be the master node acting through a metadata manager on the slave node. Key-value structures can have such a read-only property. New entries can be added under control of the metadata manager, or existing entries can be updated (e.g., to add a metadata object version or prune an old metadata object version) under control of the metadata manager, but client-initiated operations can only search for matches in a key-value structure.

3. References

References are used in numerous places in this disclosure to point, link, or provide a path to a metadata object. For example, the value field of a key-value entry can contain a reference to another key-value structure, or to a metadata object, or to a sequential list of metadata objects. One metadata object in a list can contain a reference to another succeeding or preceding metadata object in the list. In some examples, a reference can be a pointer, which is a memory address of a destination (e.g., at which a metadata object is stored). The address can be a physical address, or a logical address which is mapped to a physical address through a memory management system at the slave node. Aside from pointers, references can be disk locations, file names, table entry points, row numbers, or index values.

4. Sequential Data Structure

As described herein, multi-version concurrency control of metadata can be supported by chaining metadata object versions having different ranges of timestamp validity in a sequential data structure such as a linked list. A sequential data structure allows at least forward traversal through a succession of metadata objects, and is sometimes dubbed a "chain." In a linked list, metadata objects contain at least a forward link to a next metadata object, and can therefore be scattered throughout available memory. Other sequential data structures can be used, for example, a vector or a contiguous table. In a vector or contiguous table, metadata objects of fixed size can be used, and no forward pointer is required; the next metadata object is the next component of the vector, or the next row of the contiguous table. Other hybrid structures combining some properties or advantages of linked lists and vectors can also be used.

A Generalized Computer Environment

Figure 11:
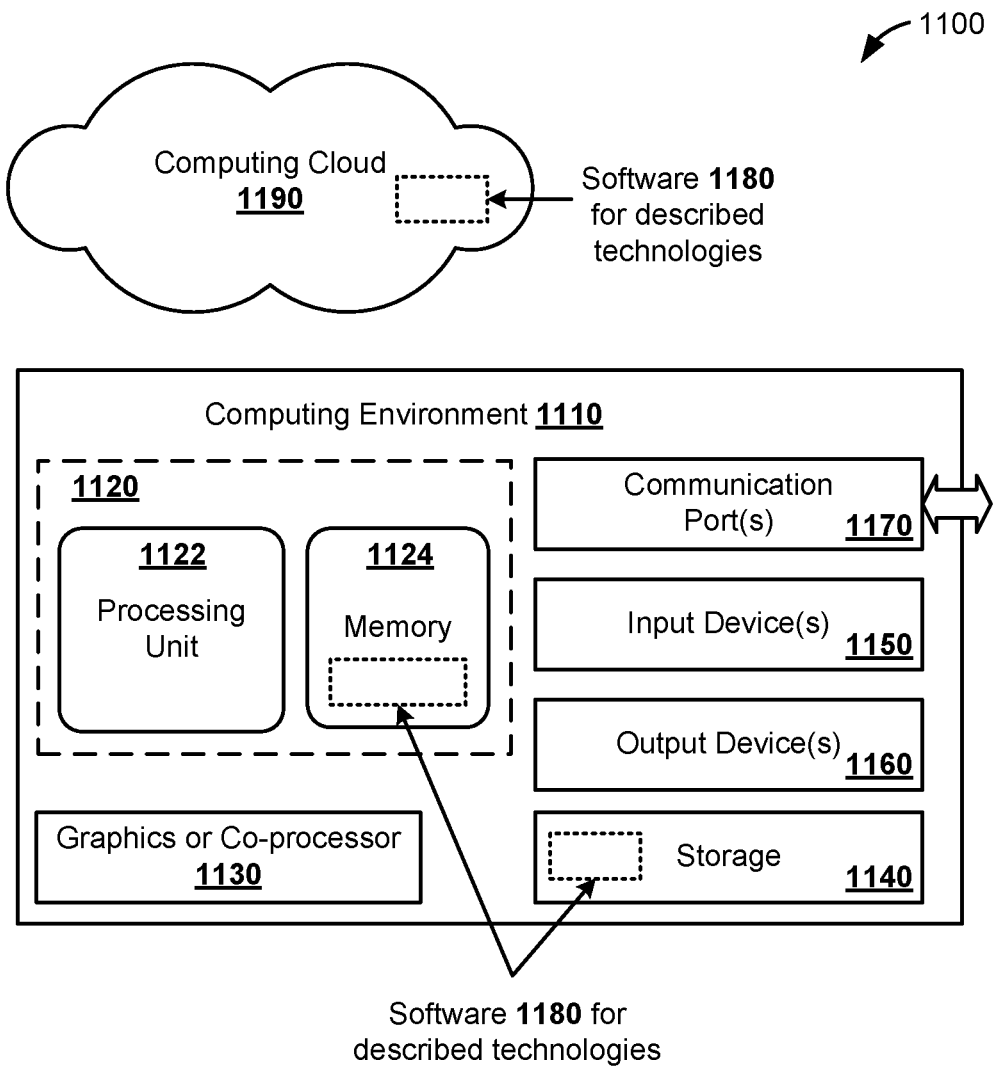
FIG. 11 is a diagram schematically depicting a computing environment suitable for implementation of disclosed technologies.

FIG. 11 illustrates a generalized example of a suitable computing system 1100 in which described examples, techniques, and technologies, including construction, deployment, operation, and maintenance of a master-slave database system with lightweight replication of metadata, can be implemented. The computing system 1100 is not intended to suggest any limitation as to scope of use or functionality of the present disclosure, as the innovations can be implemented in diverse general-purpose or special-purpose computing systems.

With reference to FIG. 11, computing environment 1110 includes one or more processing units 1122 and memory 1124. In FIG. 11, this basic configuration 1120 is included within a dashed line. Processing unit 1122 executes computer-executable instructions, such as for implementing any of the methods or objects described herein for building a slave key-value store, for retrieving metadata from the store, for updating the store, for providing multi-version concurrency, or for pruning obsolete metadata versions, or various other architectures, components, handlers, managers, modules, and repositories described herein. Processing unit 1122 can be a general-purpose central processing unit (CPU), a processor in an application-specific integrated circuit (ASIC), or any other type of processor. In a multi-processing system, multiple processing units execute computer-executable instructions to increase processing power. Computing environment 1110 can also include a graphics processing unit or co-processing unit 1130. Tangible memory 1124 can be volatile memory (e.g., registers, cache, or RAM), non-volatile memory (e.g., ROM, EEPROM, or flash memory), or some combination thereof, accessible by processing units 1122, 1130. The memory 1124 stores software 1180 implementing one or more innovations described herein, in the form of computer-executable instructions suitable for execution by the processing unit(s) 1122, 1130. The memory 1124 can also store slave key-value store (102), including key-value structures (130, 140, 150, 710) and metadata objects (161-169, 171-178, 721a-721c, 722a, 729a-729b, 921a-921c), as well as other configuration and operational data.

A computing system 1110 can have additional features, such as one or more of storage 1140, input devices 1150, output devices 1160, or communication ports 1170. An interconnection mechanism (not shown) such as a bus, controller, or network interconnects the components of the computing environment 1110. Typically, operating system software (not shown) provides an operating environment for other software executing in the computing environment 1110, and coordinates activities of the components of the computing environment 1110.

The tangible storage 1140 can be removable or non-removable, and includes magnetic disks, magnetic tapes or cassettes, CD-ROMs, DVDs, or any other medium which can be used to store information in a non-transitory way and which can be accessed within the computing environment 1110. The storage 1140 stores instructions of the software 1180 (including instructions and/or data) implementing one or more innovations described herein.

The input device(s) 1150 can be a mechanical, touch-sensing, or proximity-sensing input device such as a keyboard, mouse, pen, touchscreen, trackball, a voice input device, a scanning device, or another device that provides input to the computing environment 1110. The output device(s) 1160 can be a display, printer, speaker, optical disk writer, or another device that provides output from the computing environment 1110.

The communication port(s) 1170 enable communication over a communication medium to another computing device. The communication medium conveys information such as computer-executable instructions, requests for metadata items, copies of metadata items, or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1100 can also include a computing cloud 1190 in which instructions implementing all or a portion of the disclosed technology are executed. Any combination of memory 1124, storage 1140, and computing cloud 1190 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, software objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in one or another form of physical computer hardware.

An Example Cloud Computing Environment

Figure 12:
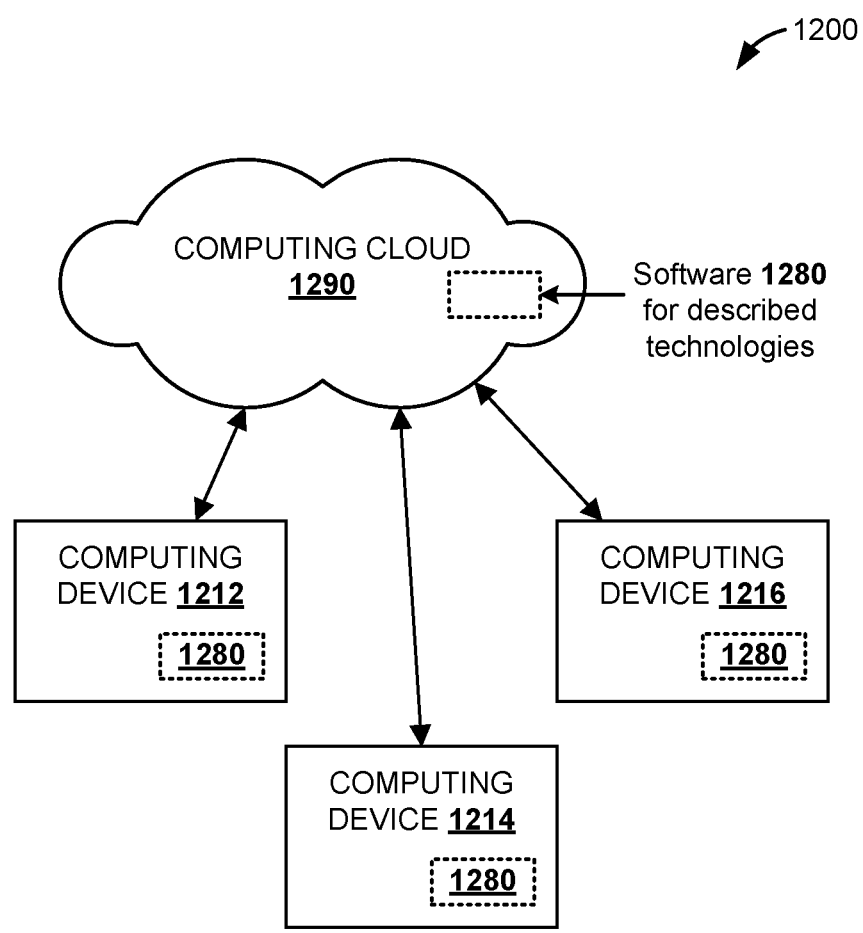
FIG. 12 is a diagram schematically depicting computing devices operating in conjunction with a computing cloud for implementation of disclosed technologies.

FIG. 12 depicts an example cloud computing environment 1200 in which the described technologies can be implemented. The cloud computing environment 1200 comprises a computing cloud 1290 containing resources and providing services. The computing cloud 1290 can comprise various types of cloud computing resources, such as computer servers, data storage repositories, networking resources, and so forth. The computing cloud 1290 can be centrally located (e.g., provided by a data center of a business or organization) or distributed (e.g., provided by various computing resources located at different locations, such as different data centers and/or located in different cities or countries).

The computing cloud 1290 can be operatively connected to various types of computing devices (e.g., client computing devices), such as computing devices 1212, 1214, and 1216, and can provide a range of computing services thereto. One or more of computing devices 1212, 1214, and 1216 can be computers (e.g., server, virtual machine, embedded systems, desktop, or laptop computers), mobile devices (e.g., tablet computers, smartphones, or wearable appliances), or other types of computing devices. Connections between computing cloud 1290 and computing devices 1212, 1214, and 1216 can be over wired, wireless, or optical links, or any combination thereof, and can be short-lived or long-lasting. These connections can be stationary or can move over time, being implemented over varying paths and having varying attachment points at each end. Computing devices 1212, 1214, and 1216 can also be connected to each other.

Computing devices 1212, 1214, and 1216 can utilize the computing cloud 1290 to obtain computing services and perform computing operations (e.g., data processing, data storage, and the like). Particularly, software 1280 for performing the described innovative technologies can be resident or executed in the computing cloud 1290, in computing devices 1212, 1214, and 1216, or in a distributed combination of cloud and computing devices.

General Considerations

As used in this disclosure, the singular forms "a," "an," and "the" include the plural forms unless the context clearly dictates otherwise. Additionally, the terms "includes" and "incorporates" mean "comprises." Further, the terms "coupled" or "attached" encompass mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "access," "determine," "extract," "find," "get," "process," "read," "respond," "update," and "use" to indicate computer operations in a computer system. These terms denote actual operations that are performed by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 11, computer-readable storage media include memory 1124, and storage 1140. The term computer-readable storage media does not include signals and carrier waves. In addition, the term computer-readable storage media does not include communication ports (e.g., 1170) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, C, C++, C#, Curl, Dart, Fortran, Java, JavaScript, Julia, Lisp, Matlab, Octave, Perl, Python, R, Ruby, SAS, SPSS, SQL, WebAssembly, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more computer-readable media having stored therein computer-executable instructions for causing one or more processors, when programmed thereby, to perform operations comprising, at a slave node in a database environment:
    instantiating a key-value store to catalog locally stored metadata from a given metadata database table, among one or more metadata database tables at a master node in the database environment; and
    adding, to the key-value store, a given key-value entry comprising a key and a value for a metadata object, wherein the metadata object includes a copy of a metadata item stored in the given metadata database table.

2. The one or more computer-readable media of claim 1, wherein, in the given key-value entry, the key comprises an identifier of the metadata item stored in the given metadata database table.

3. The one or more computer-readable media of claim 1, wherein, in the given key-value entry, the value is:
    a reference to the metadata object;
    the metadata object;
    a reference to a sequential data structure that includes the metadata object; or
    a placeholder.

4. The one or more computer-readable media of claim 1, wherein the operations further comprise:
    receiving a request for the metadata item;
    based at least in part on the request, determining a metadata item search value;
    looking up the metadata item search value in the key-value store to find the given key-value entry; and
    using the given key-value entry to get the copy of the metadata item.

5. The one or more computer-readable media of claim 4, wherein using the given key-value entry to get the copy of the metadata item comprises:
    using the value in the given key-value entry as the copy of the metadata item;
    using the value in the given key-value entry as a reference to get the metadata object and extracting the copy of the metadata item from the metadata object; or
    using the value in the given key-value entry as a reference to get a sequential data structure, traversing the sequential data structure to get the metadata object, and extracting the copy of the metadata item from the metadata object.

6. The one or more computer-readable media of claim 1, wherein the metadata object is a first version of the metadata object, the first version providing a first snapshot of the metadata item stored in the given metadata database table, and wherein the operations further comprise:
    attaching a second version of the metadata object to the given key-value entry, the second version providing a second snapshot of the metadata item stored in the given database table, wherein the second snapshot is later than the first snapshot.

7. The one or more computer-readable media of claim 6, wherein, in the given key-value entry, the value is a reference to a sequential data structure that includes the first version and the second version.

8. The one or more computer-readable media of claim 6, wherein version data for the first version indicates a first timestamp range, and wherein version data for the second version indicates a second timestamp range after the first timestamp range.

9. The one or more computer-readable media of claim 6, wherein the operations further comprise:
    receiving a request for the metadata item, the request including a timestamp;
    based at least in part on the request, determining a metadata item search value;
    looking up the metadata item search value in the key-value store to find the given key-value entry; and
    based at least in part on comparisons of the timestamp of the request to a timestamp limit of the first version and/or a timestamp limit of the second version, determining the copy of the metadata item from the second version, wherein the second version is valid at the timestamp of the request.

10. The one or more computer-readable media of claim 1, wherein the given metadata database table at the master node supports guaranteed database transactions, and wherein the key-value store at the slave node supports non-guaranteed operations.

11. The one or more computer-readable media of claim 10, wherein the key-value store is managed as a read-only cache.

12. The one or more computer-readable media of claim 1, wherein the operations further comprise:
    for each of one or more metadata database tables, among the one or more metadata database tables at the master node, instantiating a respective key-value structure within the key-value store.

13. The one or more computer-readable media of claim 12, wherein the one or more metadata database tables include the given metadata database table, and the operations further comprise:
    instantiating a parent key-value structure; and
    adding, to the parent key-value structure, a parent key-value entry for the given metadata database table, the parent key-value entry comprising:
        a key; and
        a value for the key-value structure for the given metadata database table.

14. The one or more computer-readable media of claim 1, wherein the slave node is a first slave node, and wherein the operations further comprise, at a second slave node in the database environment:
    instantiating a second key-value store to catalog locally stored metadata from another metadata database table, among the one or more metadata database tables at the master node, that is not replicated at the first slave node; and
    adding, to the second key-value store, a second key-value entry comprising a second key and a second value for a second metadata object, wherein the second metadata object includes a copy of a second metadata item stored in the other metadata database table.

15. The one or more computer-readable media of claim 1, wherein the operations further comprise:
    receiving a request for the metadata item, wherein adding the given key-value entry is performed in response to the receiving the request.

16. A computer system comprising one or more processors and memory, wherein the computer system implements a name server configured to perform operations of a slave node in a database environment, the operations comprising:

instantiating a key-value structure for a given metadata database table, among one or more metadata database tables at a master node in the database environment; and adding, to the key-value structure for the given metadata database table, a given key-value entry, the given key-value entry comprising a key and a value for a metadata object, wherein the metadata object includes a copy of a metadata item stored in the given metadata database table.

17. A method comprising:

at a slave node in a database environment:
instantiating a key-value store to catalog locally stored metadata from a given metadata database table, among one or more metadata database tables at a master node in the database environment; and adding, to the key-value store, a given key-value entry comprising a key and a value for a metadata object, wherein the metadata object includes a copy of a metadata item stored in the given metadata database table.

18. The method of claim 17, wherein, in the given key-value entry:

the key comprises an identifier of the metadata item stored in the given metadata database table; and the value comprises:
a reference to the metadata object;
the metadata object;
a reference to a sequential data structure that includes the metadata object; or
a placeholder.

19. The method of claim 17, further comprising:

receiving a request for the metadata item;

based at least in part on the request, determining a metadata item search value;

looking up the metadata item search value in the key-value store to find the given key-value entry; and using the given key-value entry to get the copy of the metadata item.

20. The method of claim 17, wherein the metadata object is a first version of the metadata object, the first version providing a first snapshot of the metadata item stored in the given metadata database table, and further comprising:

attaching a second version of the metadata object to the given key-value entry, the second version providing a second snapshot of the metadata item stored in the given database table, wherein the second snapshot is later than the first snapshot.

* * * * *